United States Patent [19]

Calvert

[11] 3,729,322

[45] Apr. 24, 1973

[54] FREEZE AND THAW IMITATION SOUR CREAM

[75] Inventor: Philip B. Calvert, Denver, Colo.

[73] Assignee: Roberts Dairy Company, Omaha, Nebr.

[22] Filed: Feb. 27, 1970

[21] Appl. No.: 15,289

[52] U.S. Cl. ..................................99/54, 99/59
[51] Int. Cl. ..........................................A23c 13/00
[58] Field of Search........................99/54, 59, 192

[56] References Cited

UNITED STATES PATENTS

| | | | |
|---|---|---|---|
| 3,437,494 | 4/1969 | Lotor | 99/54 |
| 3,076,709 | 2/1963 | Rivoche | 99/54 |
| 3,563,760 | 2/1971 | Kawabara | 99/59 |
| 3,210,201 | 10/1965 | Tumerman | 99/192 |
| 3,235,387 | 2/1966 | Stumbo | 99/59 |
| 3,432,306 | 3/1969 | Edwards | 99/54 |
| 3,321,319 | 5/1967 | Hackenberg | 99/59 |

*Primary Examiner*—Robert L. Lindsay, Jr.
*Assistant Examiner*—Frederick Frei
*Attorney*—Kenyon & Kenyon Reilly Carr & Chapin

[57] ABSTRACT

A food product having the flavor and consistency of sour cream, which is capable of being frozen for an extended period of time and subsequently thawed while still retaining its smooth texture and which contains a unique combination of hydrophilic colloids including cross-linked amioca starch, low methoxyl pectin and hydroxypropyl methyl cellulose. The invention also includes the process by which the product is manufactured.

7 Claims, No Drawings

FREEZE AND THAW IMITATION SOUR CREAM

BACKGROUND OF THE INVENTION

This invention relates to food products and in particular to food products which have the flavor and consistency of sour cream, yet unlike the natural product are capable of being stored for a significant period of time in a frozen state and subsequently, thawed for use. The thawed product of this invention exhibits the same smooth texture as sour cream.

Normal use of sour cream or sour cream based products requires that they be consumed within a relatively short period of time following their purchase because of their short shelf lives in refrigerators at temperatures of 40°–50° F.

On the other hand, it has not been thought practical to freeze these products to extend their shelf lives because a normal concomitant of the freezing process is the formation of ice crystals within the foodstuff which tend to break up its structure and cause separation. This crystal formation and separation would be especially damaging to the smooth texture of sour cream.

Various products are presently on the market which are either imitation sour creams or frozen dairy-type products. None of these, however, combine the flavor and texture of sour cream with the capacity of being frozen to lengthen shelf life. The present invention provides foodstuffs having the taste and texture of sour cream which can be frozen and thawed for use and processes for their preparation.

THE INVENTION

The invention comprises a homogenous food product comprising water, milk products, hydrogenated vegetable oil, emulsifiers, a lactiferous bacterial culture, and hydrophilic colloids.

A critical feature of this invention is the unique use of a combination of hydrophilic colloids such as starch, pectin and hydroxypropyl methyl cellulose. The use of these colloids permits the production of a sour cream-like product having the ability to withstand freezing and thawing without exhibiting deteriorative changes in the consistency of the thawed product.

In ordinary sour cream or existing sour cream-like products, the smooth consistency of the product is destroyed by the freezing process. This change in physical appearance is a result of the de-emulsification of the fat protein and flocculation of the casein complex during the freezing process and within the frozen mass.

The use of the combination of colloids set forth herein, effectively prevents de-emulsification of the oil in water emulsion formed during the process and flocculation of the coagulated protein complex present. This result is obtained because of the ability of the colloidal system to function effectively within the ph range of the product, and at temperatures below the freezing point of water. Although the precise mechanism of this protective action is not thoroughly understood, it is thought to be the result of a reduction in the amount of water made available for freezing due to hydration of the colloids and to the formation of a gel structure in the product which offers a mechanical obstruction to both ice crystal growth and the concentration of solids in the unfrozen portion of the partially frozen mass, thus preserving the consistency of the product when it is thawed.

The hydrophilic colloids employed in the products of this invention are utilized in combination and comprise starch, such as an unmodified amioca starch (amylopectin) although a cross-linked or cross-bonded type of amioca starch possessing increased freeze-thaw stability, is preferred. An example of this latter type of starch is one sold under the tradename Polar Gel 8 manufactured by the American Maize Products Company. "Polar Gel 8" starch is a dual modified waxy corn starch made by a combination of treatments with phosphorous oxychloride and acetic anhydride. The treatment with phosphorous oxychloride is described in claim 6 of U.S. Pat. No. 2,328,537, issued Sept. 7, 1943 to Felton and Schopmeyer, and the treatment with acetic anhydride is described in claim 6 of U.S. Pat. No. 2,461,139, issued Feb. 8, 1949 to Caldwell. The starch is usually employed in about 1.80 to 2.50 parts, preferably about 2.00 parts per 100 parts of product.

Combined with the starch are other colloids such as pectin and hydroxypropyl methyl cellulose. A low methoxyl pectin is preferred and one which gives excellent results is sold under the tradename Product 3475 – Hi Poly Brand Citrus Pectin manufactured by Sunkist Growers. Gelation of this type of pectin is based on a mechanism requiring the presence of a polyvalent metal ion such as calcium which is provided by the nonfat skim milk powder used in the product. The pectin is usually used in amounts of about 0.25 to 0.50 parts, and preferably, about 0.30 parts per 100 parts of product.

The hydroxypropyl methyl cellulose employed in this invention is produced having different physical and chemical properties. These properties are dependent upon varying ratios of propylene glycol ether substitution on the anhydroglucose units. A preferred product is one manufactured under the tradename Methocel 65HC400 by the Dow Chemical Company. The hydroxyproply methly cellulose is employed in amounts of 0.20 to 0.40, and preferably, 0.30 parts per 100 parts of product.

The preferred milk products used in the product of the invention are nonfat skim milk solids and sodium caseinate. Others, such as whey solids, demineralized whey solids, lactose, or combinations thereof, can also be employed.

The preferred emulsifiers employed are lecithin and compositions such as polyoxyethylene (20) sorbitan monooleate, mono- and di-glycerides, polyoxyethylene (20) sorbitan monostearate and sorbitan monostearate and combinations of these. Among the preferred combinations are the polyoxyethylene (20) sorbitan monooleate and mono- and di-glycerides in a 20/80 ratio and the polyoxyethylene (20) sorbitan monostearate and sorbitan monostearate in a 40/60 ratio. Other conventional emulsifiers may be employed if desired.

Numerous hydrogenated vegetable oils such as corn, cotton, soybean, etc., may be used. Preferred, however, are those having a solid fat index at 50° F of 70 or higher and a Wiley melting point between 100° and 112° F and the preferable degree of hydrogenation is from 4 to 60 iodine value.

Acidification of the product is induced by innoculation with a lactic acid producing culture such as *Streptococcus lactis*. Other well-known cultures may be employed if desired. The ph of the product is controlled such that it is generally between 4.6 and 4.8.

A preferred procedure for carrying out the process involves mixing the milk products, a portion of the water, emulsifiers, and optional flavor enhancers in a blending machine and blending for a period of preferably about from 5 to about 10 minutes. While there are many blenders commercially available for this task, it has been found the Lanco Likwifier is particularly useful in this step. To enhance the flavor of the product, it has been found that the addition of salt along with the milk products and emulsifiers is especially useful.

The liquified product of the blending operation is then heated to a temperature of at least 150° F, but no more than 160° F, and combined with a previous mixed combination of the hydrophilic colloids.

Heating is then continued with a portion of the vegetable oil added to the heated mixture. The remainder of the vegetable oil is separately melted and admixed with a hydrophilic type of lecithin possessing good emulsifying properties; an example of which is sold under the tradename Centrol C. A. Lecithin by the Central Soya Company. "centrol" lecithin is manufactured in accordance with U.S. Pat. No. 3,301,881, issued Jan. 31, 1967 to Davis. The blend of vegetable oil and lecithin is then added to the mixture. An alternate method at this point is to add the lecithin to the entire portion of vegetable oil in the melted state, and then to add the vegetable oil-lecithin blend to the mixture.

The temperature of the entire mass is then raised to at least 190° F, but no more than about 195° F, to gelatinize the starch in the formulation and to effect pasteurization. This temperature is maintained for at least about 5 minutes. At this point, the balance of the water is added while maintaining a temperature of at least 180° F.

The pasteurized mixture is then ready for homogenation which is carried out in any suitable vessel. It has been found that a two-stage homogenizer with 2,500 pounds of pressure in the first stage and 500 pounds in the second stage is useful, but the first stage can also be accomplished at a pressure of from 1,500 to 2,500 pounds, while the second stage at a pressure of from 300 to 1,000 pounds.

The pasteurized and homogenized mass is then cooled to at least 77° F, but no less than 70° F, preferably 76° F in preparation for administration of a lactiferous culture. This cooling may be accomplished with a plate cooler or a jacketed vessel. It is essential that air is not incorporated in the mixture during homogenization and cooling as it would have a deteriorative effect upon the smooth texture of the finished product.

The mass is then innoculated with a lactic acid producing culture such as one consisting of *Streptococcus lactis*, and preferably in conjunction with certain flavor-producing streptococci such as *Streptococcus citrovorus*. Frozen concentrated cultures such as Fargo have been used with good results. The culture is permitted to ripen until the desired body is obtained in the finished product, preferably to 0.80 – 0.85 percent titratable acidity.

Aside from a *Streptococcus lactis* culture, other agents which may be used to produce the desired degree of acidification include various food grade acids such as malic, lactic or citric or combinations thereof. If this direct acidification method is applied, the acidified mass should be pumped through a series of in line screens or an in line homogenizing valve to achieve a smooth consistency in the finished product.

The products may be stored separately or blended with a myriad of flavoring substances to produce, for example, dips, or dressings, or sauces. The product is then cooled to 40° F or less.

Flash freezing may be used to transform the product into a frozen state. The more rapidly the product is frozen, the better the body of the thawed product will be.

The consumer may keep the product in its frozen state for a period of from 4 to 12 weeks and use when needed simply by thawing.

Typical amounts of the preferred ingredients used in the products of this invention are set forth in Table I below.

TABLE I

| Ingredient | Proportions (parts per 100 parts product) | |
|---|---|---|
| | Range | Preferred |
| Sodium caseinate | 1.80 – 3.50 | 2.00 (if used in conjunction with skim milk solid) 3.00 (if used with other milk derivatives). |
| Other milk derivatives (if used to replace skim milk solids) | 5.00 – 9.00 | 6.00 |
| Skim milk solids | 7.00 – 8.00 | 7.50 |
| Starch | 1.80 – 2.50 | 2.00 |
| Hydrogenated vegetable oil | 12.00 – 18.00 | 14.00 |
| Hydroxypropyl methyl cellulose | .20 – .40 | .30 |
| Pectin | .25 – .50 | .30 |
| Polyoxyethylene (20) sorbitan monooleate and mono and di-glyceride in a 20/80 ratio or | .12 – .20 | .15 |
| Polyoxyethylene (20) sorbitan mono stearate and sorbitan monostearate in a 40/60 ratio | .30 – .40 | .40 |
| Lecithin | .05 – .08 | .06 |
| Balance water | | |

The following example illustrates a method of preparation and formulation of the product and modifications thereof will be obvious to one skilled in the Art.

EXAMPLE

The following formulation has been used to produce a preferred freeze and thaw sour cream (all proportions are expressed as parts by weight):

| | |
|---|---|
| Skim Milk solids | 7.50 |
| Sodium Caseinate | 2.00 |
| Starch | 2.00 |
| Hydrogenated Vegetable Oil | 14.70 |
| Water | 72.87 |
| Pectin | .30 |
| Hydroxypropyl methyl cellulose | .30 |
| Lecithin | .06 |
| Polyoxyethylene (20) Sorbitan Monooleate | .03 |
| Mono- and di-glycerides | .12 |
| Salt | .12 |

In preparing the above formulation, the skim milk solids, sodium caseinate, polyoxyethylene (20) sorbitan monooleate and mono- and di-glycerides were added to a portion of the water in a blending machine, mixed, and heated to 150° F.

A dry blend of the starch, pectin, and hydroxypropyl methyl cellulose was prepared and added to the heated mixture. While the heating was continued, a portion of the hydrogenated vegetable oil was added and the remainder was separately melted and mixed with the lecithin before being added to the heated bulk.

After all the ingredients had been admixed, the mass was heated to 190° F and held at that temperature for a period of five minutes. The balance of the water was then added, while the temperature of the mixture maintained at 180° F.

Following the pasteurization, the mixture was homogenized in a two-stage process with 2,500 pounds os pressure used in the first stage and 500 pounds in the second stage.

The homogenized mixture was then cooled through a plate cooler to 76° F. At that temperature, it was innoculated with a lactic acid-producing culture and permitted to ripen to 0.80 – 0.85 percent titratable acidity.

The finished product was thereupon frozen for storage, and when thawed after 12 weeks, exhibited the flavor and texture of natural sour cream.

What is claimed is:

1. A food product having the flavor and consistency of sour cream which is capable of being frozen for an extended period of time and subsequently thawed while retaining its smooth texture comprising water, milk products, hydrogenated vegetable oil, emulsifiers, and acidifying agent, and a combination of hydrophilic colloids including cross-linked amioca starch, low methoxyl pectin and hydroxypropyl methyl cellulose wherein the pH of said product being about 4.6 to 4.8

2. A food product according to claim 1 wherein said cross-linked amioca starch is employed in the range of about 1.80 to 2.50 parts per 100 parts product, said low methoxyl pectin is employed in the range of about 0.25 to about 0.50 parts per 100 parts product, and said hydroxypropyl methyl cellulose is employed in the range of 0.20 to about 0.40 parts per 100 parts product.

3. A food product according to claim 1 wherein said acidifying agent is selected from the group consisting of a lactiferous bacterial culture, malic acid, lactic acid, citric acid, or combinations thereof.

4. A food product according to claim 3 wherein said lactiferous bacterial culture is *Streptococcus lactis*.

5. A food product according to claim 1 wherein said hydrogenated vegetable oil has a solid fat index at 50° F. of 70 or higher, a Wiley melting point of between about 100° F. and about 112° F., and an iodine value of from about 4 to about 60.

6. A food product according to claim 1 wherein said emulsifiers are selected from the group consisting of lecithin, polyoxyethylene (20) sorbitan monooleate, mono- and di-glycerides, polyoxyethylene (20) sorbitan monostearate, sorbitan monostearate, and combinations of these.

7. A food product having the flavor and consistency of sour cream which is capable of being frozen for an extended period of time and subsequently thawed while retaining its smooth texture comprising water, milk products, hydrogenated vegetable oil, emulsifiers, an acidifying agent, and a combination of hydrophilic colloids including a cross-linked amioca starch, pectin and hydroxypropyl methyl cellulose wherein the pH of said product is in the range of about 4.6 to 4.8.

* * * * *